(12) United States Patent
Weingaertner et al.

(10) Patent No.: US 12,136,725 B2
(45) Date of Patent: Nov. 5, 2024

(54) ELECTROLYZER SYSTEM WITH STEAM GENERATION AND METHOD OF OPERATING SAME

(71) Applicant: Bloom Energy Corporation, San Jose, CA (US)

(72) Inventors: David Weingaertner, San Jose, CA (US); Martin Perry, San Jose, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 0 days.

(21) Appl. No.: 17/937,364

(22) Filed: Sep. 30, 2022

(65) Prior Publication Data
US 2023/0155214 A1    May 18, 2023

Related U.S. Application Data

(60) Provisional application No. 63/278,741, filed on Nov. 12, 2021.

(51) Int. Cl.
| | |
|---|---|
| *C25B 1/02* | (2006.01) |
| *C25B 1/04* | (2021.01) |
| *C25B 1/042* | (2021.01) |
| *H01M 8/1246* | (2016.01) |

(Continued)

(52) U.S. Cl.
CPC ........... *H01M 16/003* (2013.01); *C25B 1/042* (2021.01); *H01M 8/1246* (2013.01); *H01M 2008/1293* (2013.01); *H01M 2300/0071* (2013.01)

(58) Field of Classification Search
CPC ............ H01M 16/003; H01M 8/1246; H01M 2008/1293; H01M 2300/0071; C25B 1/02; C25B 1/04; C25B 1/042
See application file for complete search history.

(56) References Cited

U.S. PATENT DOCUMENTS

| | | | |
|---|---|---|---|
| 6,655,150 B1 | 12/2003 | Asen et al. | |
| 2005/0164051 A1* | 7/2005 | Venkataraman | .... H01M 8/2432 |
| | | | 429/495 |
| 2008/0241638 A1 | 10/2008 | McElroy et al. | |

(Continued)

FOREIGN PATENT DOCUMENTS

| | | |
|---|---|---|
| CN | 113503191 A | 10/2021 |
| EP | 4086370 A2 | 11/2022 |
| EP | 4181251 A1 | 5/2023 |

OTHER PUBLICATIONS

Partial European Search Report dated Jun. 6, 2023 issued in corresponding European Application No. 22206604.5.

(Continued)

*Primary Examiner* — Zulmariam Mendez
(74) *Attorney, Agent, or Firm* — THE MARBURY LAW GROUP PLLC (57) ABSTRACT

An electrolyzer system and a fuel cell system that include hydrogen blowers configured to compress hydrogen streams generated by the systems. The electrolyzer system includes a steam generator configured to generate steam, a stack of solid oxide electrolyzer cells configured to generate a hydrogen stream using the steam received from the steam generator, a hydrogen blower configured to pressurize the hydrogen stream generated by the stack, and a hydrogen processor configured to compress the pressurized hydrogen stream.

14 Claims, 6 Drawing Sheets

(51) Int. Cl.
*H01M 16/00* (2006.01)
*H01M 8/12* (2016.01)

(56) References Cited

U.S. PATENT DOCUMENTS

| | | | |
|---|---|---|---|
| 2012/0196194 A1* | 8/2012 | Perry | F28F 9/02 |
| | | | 429/410 |
| 2013/0108936 A1 | 5/2013 | McElroy et al. | |
| 2014/0072899 A1 | 3/2014 | McElroy et al. | |
| 2017/0175277 A1* | 6/2017 | von Olshausen | C25B 9/05 |
| 2018/0287179 A1* | 10/2018 | Rueger | C25B 9/05 |
| 2019/0245224 A1* | 8/2019 | Lacroix | H01M 8/04014 |
| 2020/0328445 A1* | 10/2020 | Weingaertner | H01M 8/1246 |
| 2022/0372636 A1 | 11/2022 | Weingaertner et al. | |
| 2023/0013942 A1 | 1/2023 | Weingaertner et al. | |

OTHER PUBLICATIONS

Extended European Search Report mailed Sep. 15, 2023 in corresponding European Application No. 22206604.5.

* cited by examiner

ELECTROLYZER SYSTEM WITH STEAM GENERATION AND METHOD OF OPERATING SAME

FIELD

The present invention is directed to electrolyzer systems including solid oxide electrolyzer cells (SOEC) and methods of operating the same.

BACKGROUND

Solid oxide fuel cells (SOFC) can be operated as an electrolyzer in order to produce hydrogen and oxygen, referred to as solid oxide electrolyzer cells (SOEC). In SOFC mode, oxygen ions are transported from the cathode side (air) to the anode side (fuel) and the driving force is the chemical gradient of partial pressure of oxygen across the electrolyte. In SOEC mode, a positive potential is applied to the air side of the cell and the oxygen ions are now transported from the fuel side to the air side. Since the cathode and anode are reversed between SOFC and SOEC (i.e. SOFC cathode is SOEC anode, and SOFC anode is SOEC cathode), the SOFC cathode (SOEC anode) can be referred to as the air electrode, and the SOFC anode (SOEC cathode) can be referred to as the fuel electrode. During SOEC mode, water in the fuel stream is reduced ($H_2O + 2e^- \rightarrow O^{2-} + H_2$) to form $H_2$ gas and $O^{2-}$ ions, $O^{2-}$ ions are transported through the solid electrolyte, and then oxidized on the air side ($O^{2-}$ to $O_2$) to produce molecular oxygen. Since the open circuit voltage for a SOFC operating with air and wet fuel (hydrogen, reformed natural gas) is on the order of 0.9 to 1V (depending on water content), the positive voltage applied to the air side electrode in SOEC mode raises the cell voltage up to typical operating voltages of 1.1 to 1.3V.

SUMMARY

In various embodiments, provided is an electrolyzer system comprising: a steam generator configured to generate steam; a stack of solid oxide electrolyzer cells configured to generate a hydrogen stream using the steam generated by the steam generator; a hydrogen blower configured to pressurize the hydrogen stream generated by the stack; and a hydrogen processor configured to compress the pressurized hydrogen stream.

In various embodiments, provided is a fuel cell system comprising: a hotbox; a stack of solid oxide fuel cells disposed in the hotbox and configured to generate power; an anode tail gas oxidizer (ATO) disposed in the hotbox; a fuel exhaust processor configured to separate an anode exhaust stream received from the stack and output a carbon dioxide stream and a hydrogen stream; a hydrogen blower configured to pressurize the hydrogen stream; a hydrogen processor configured to compress the pressurized hydrogen stream; and a carbon dioxide processor configured to compress the carbon dioxide stream.

BRIEF DESCRIPTION OF THE DRAWINGS

The accompanying drawings, which are incorporated herein and constitute part of this specification, illustrate example embodiments of the invention, and together with the general description given above and the detailed description given below, serve to explain the features of the invention.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

Ranges can be expressed herein as from "about" one particular value, and/or to "about" another particular value. When such a range is expressed, examples include from the one particular value and/or to the other particular value. Similarly, when values are expressed as approximations, by use of the antecedent "about" or "substantially" it will be understood that the particular value forms another aspect. In some embodiments, a value of "about X" may include values of +/−1% X. It will be further understood that the endpoints of each of the ranges are significant both in relation to the other endpoint, and independently of the other endpoint.

It will be apparent to those skilled in the art that various modifications and variations can be made to the present disclosure without departing from the spirit and scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

Herein, a "solid oxide cell" may refer to a solid oxide electrolyzer cell and/or a solid oxide fuel cell.

SOEC Systems

Figure 1A:
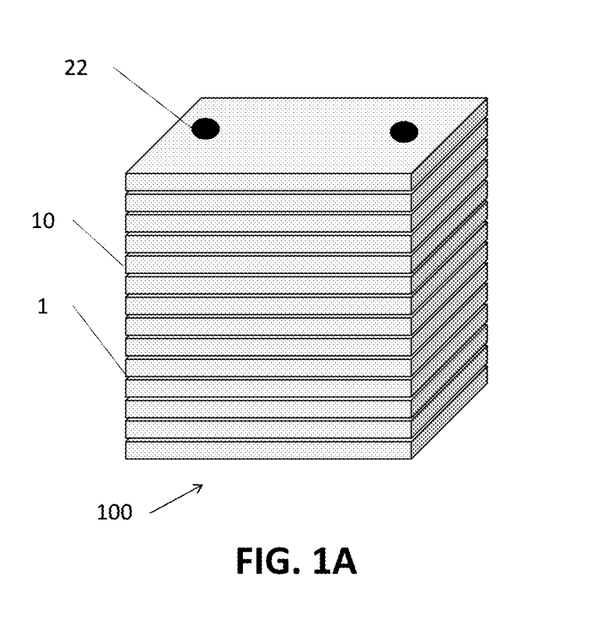
FIG. 1A is a perspective view of a solid oxide electrolyzer cell (SOEC) stack.
Figure 1B:
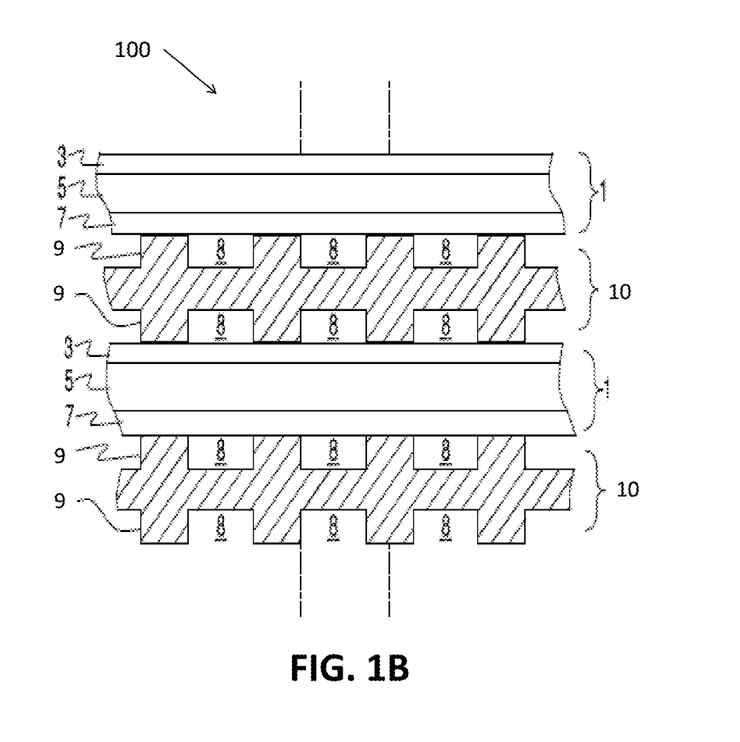
FIG. 1B is a side cross-sectional view of a portion of the stack of FIG. 1A.

FIG. 1A is a perspective view of a solid oxide cell stack 100, and FIG. 1B is a side cross-sectional view of a portion of the stack 100 of FIG. 1A. Referring to FIGS. 1A and 1B, the stack 100 includes multiple solid cells 1 that may be solid oxide fuel cells or solid oxide electrolyzer cells. The solid oxide cells 1 are separated by interconnects 10, which may also be referred to as gas flow separator plates or bipolar plates. Each solid oxide cell 1 includes an air electrode 3, a solid oxide electrolyte 5, and a fuel electrode 7. The stack 100 also includes internal fuel riser channels 22.

Each interconnect 10 electrically connects adjacent solid oxide cells 1 in the stack 100. In particular, an interconnect 10 may electrically connect the fuel electrode 7 of one solid oxide cell 1 to the air electrode 3 of an adjacent solid oxide cell 1. FIG. 1B shows that the lower solid oxide cell 1 is located between two interconnects 10.

Each interconnect 10 includes ribs 9 that at least partially define fuel channels 8. The interconnect 10 may operate as a gas-fuel separator that separates a fuel, such as a hydrocarbon fuel, flowing to the fuel electrode 7 of one solid oxide cell 1 in the stack 100 from oxidant, such as air, flowing to the air electrode 3 of an adjacent solid oxide cell 1 in the stack 100. At either end of the stack 100, there may be an air end plate or fuel end plate (not shown) for providing air or fuel, respectively, to the end electrode.

Figure 2A:
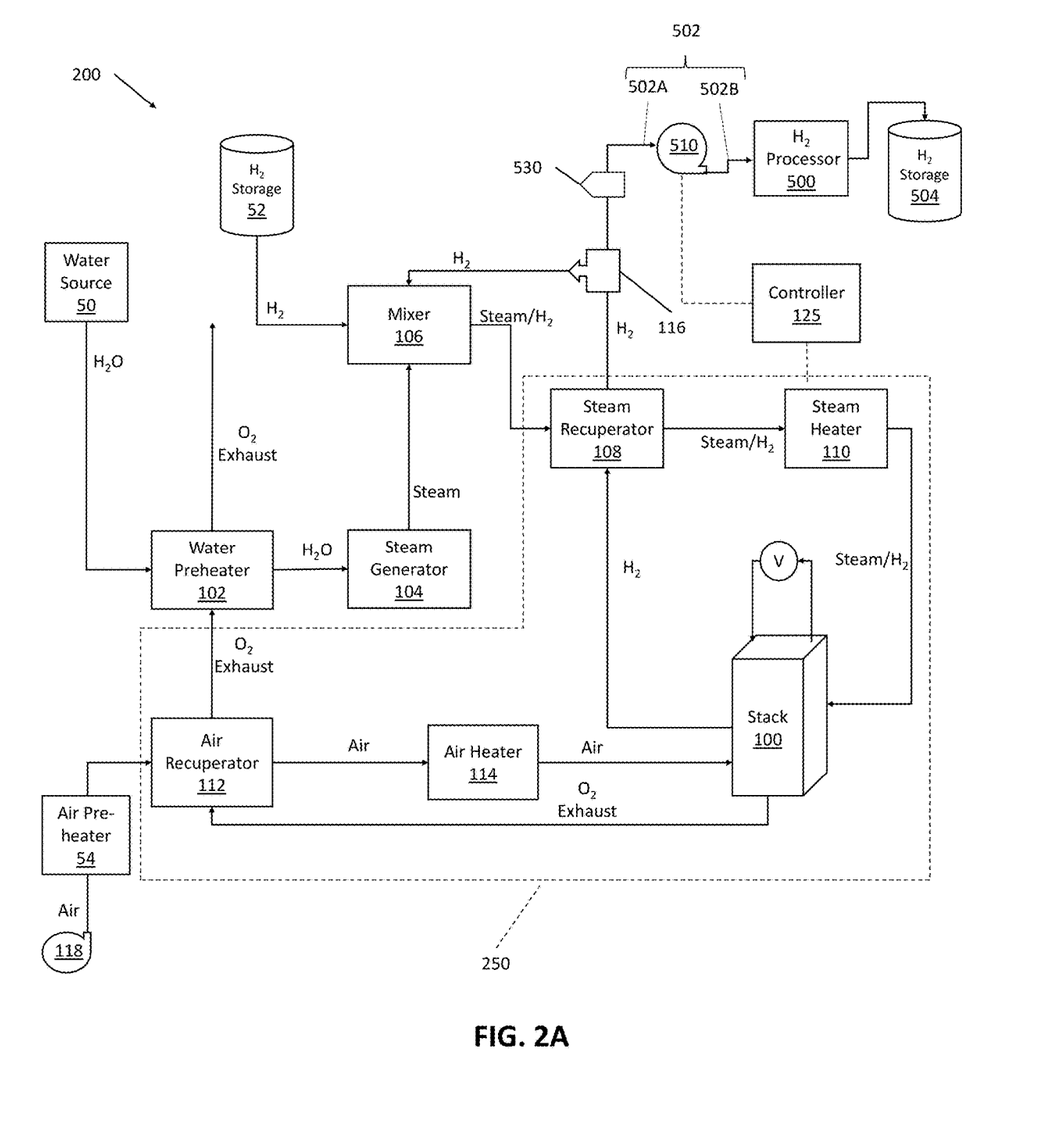
FIGS. 2A and 2B are schematic views of process flow diagrams showing process flows through an electrolyzer system according to various embodiments of the present disclosure.
Figure 2B:
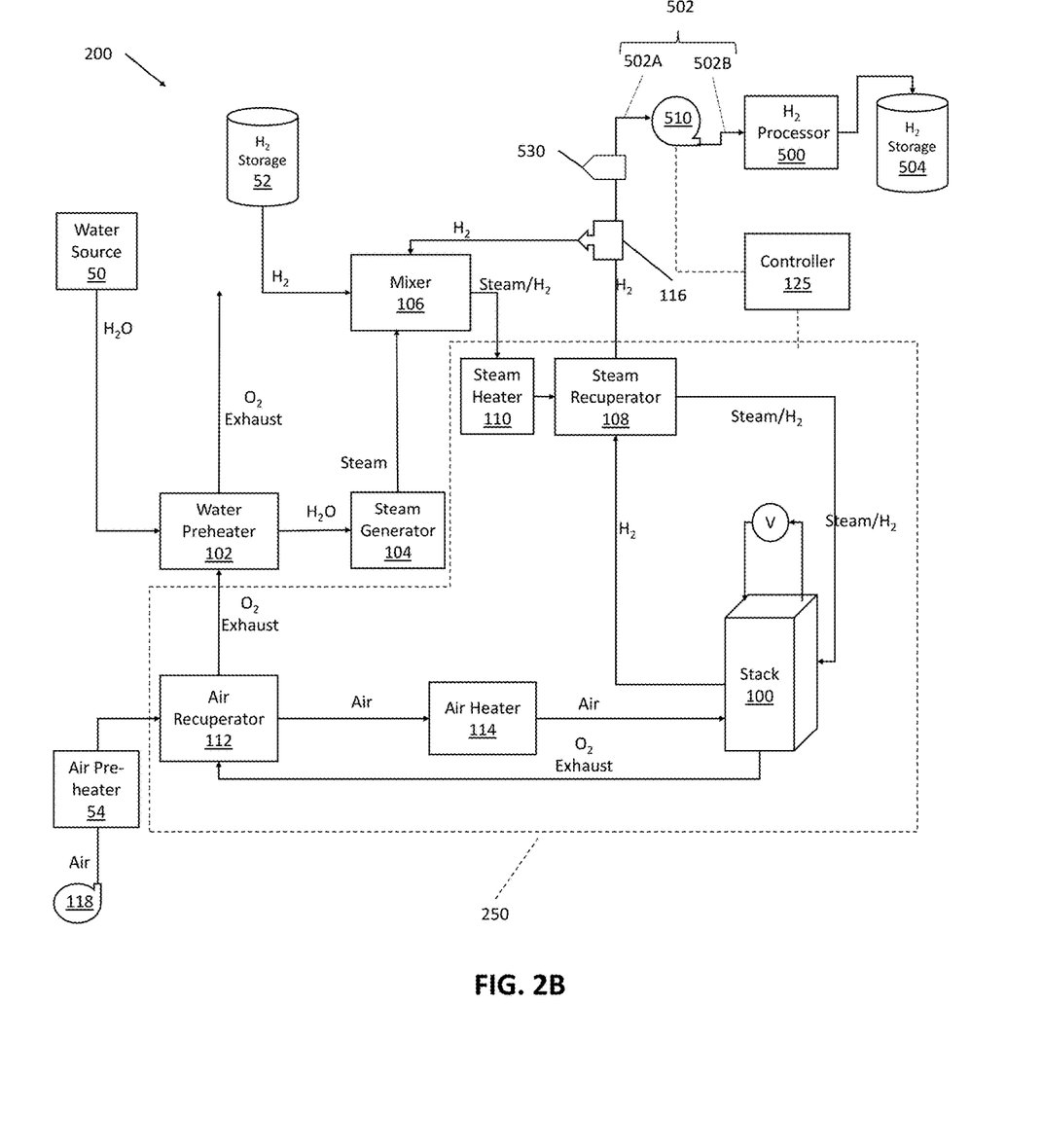

FIGS. 2A and 2B are schematic views showing a process flows in an electrolyzer system 200, according to various embodiments of the present disclosure. Referring to FIGS. 1A, 1B, 2A and 2B, the system 200 may include an electrolyzer cell (SOEC) stack 100 including multiple solid oxide electrolyzer cells (SOECs), which may be configured as described with respect to FIGS. 1A and 1B. The system 200 may also include a steam generator 104, a steam recuperator 108, a steam heater 110, an air recuperator 112, and an air heater 114. The system 200 may also include an optional water preheater 102 and an optional mixer 106.

The system 200 may include a hotbox 250 to house various components, such as the stack 100, steam recuperator 108, steam heater 110, air recuperator 112, and/or air heater 114. In some embodiments, the hotbox 250 may include multiple stacks 100. The water preheater 102 and the steam generator 104 may be located external to the hotbox 250 as shown in FIGS. 2A and 2B. Alternatively, the water preheater 102 and/or the steam generator 104 may be located inside the hotbox 250.

During operation, the stack 100 may be provided with steam and electric current or voltage from an external power source. In particular, the steam may be provided to the fuel electrodes 7 of the electrolyzer cells 1 of the stack 100, and the power source may apply a voltage between the fuel electrodes 7 and the air electrodes 3, in order to electrochemically split water molecules and generate hydrogen (e.g., $H_2$) and oxygen (e.g., $O_2$). Air may also be provided to the air electrodes 3, in order to sweep the oxygen from the air electrodes 3. As such, the stack 100 may output a hydrogen stream and an oxygen-rich exhaust stream, such as an oxygen-rich air stream ("oxygen exhaust stream").

In order to generate the steam, water may be provided to the system 200 from a water source 50. The water may be deionized (DI) water that is deionized as much as is practical (e.g., <0.1 μS/cm), in order to prevent and/or minimize scaling during vaporization. In some embodiments, the water source 50 may include deionization beds. In various embodiments, the system 200 may include a water flow control device (not shown) such as a mass flow controller, a positive displacement pump, a control valve/water flow meter, or the like, in order to provide a desired water flow rate to the system 200.

If the system 200 includes the water preheater 102, the water may be provided from the water source 50 to the water preheater 102. The water preheater 102 may be a heat exchanger configured to heat the water using heat recovered from the oxygen exhaust stream. Preheating the water may reduce the total power consumption of the system 200 per unit of hydrogen generated. In particular, the water preheater 102 may recover heat from the oxygen exhaust stream that may not be recoverable by the air recuperator 112, as discussed below. The oxygen exhaust stream may be output from the water preheater 102 at a temperature above 80° C., such as above 100° C., such as a temperature of about 110° C. to 120° C.

The water output from the water preheater 102 or the water source 50 may be provided to the steam generator 104.

A portion of the water may vaporize in the water preheater. The steam generator 104 may be configured to heat the water not vaporized in the water preheater to convert the water into steam. For example, the steam generator 104 may include a heating element to vaporize the water and generate steam. For example, the steam generator 104 may include an AC or DC resistance heating element, or an induction heating element.

The steam generator 104 may include multiple zones/elements that may or may not be mechanically separate. For example, the steam generator 104 may include a pre-boiler to heat the water up to, or near to the boiling point. The steam generator 104 may also include a vaporizer configured to convert the pre-boiled water into steam. The steam generator 104 may also include a deaerator to provide a relatively small purge of steam to remove dissolved air from the water prior to bulk vaporization. The steam generator 104 may also include an optional superheater configured to further increase the temperature of the steam generated in the vaporizer. The steam generator 104 may include a demister pad located downstream of the heating element and/or upstream from the super heater. The demister pad may be configured to minimize entrainment of liquid water in the steam output from the steam generator 104 and/or provided to the superheater.

If the steam product is superheated, it will be less likely to condense downstream from the steam generator 104 due to heat loss to ambient conditions. Avoidance of condensation is preferable, as condensed water is more likely to form slugs of water that may cause significant variation of the delivered mass flow rate with respect to time. It may also be beneficial to avoid excess superheating, in order to limit the total power consumption of the system 200. For example, the steam may be superheated by an amount ranging from about 10° C. to about 100° C.

Blowdown from the steam generator 104 may be beneficial for long term operation, as the water will likely contain some amount of mineralization after deionization. Typical liquid blowdown may be on the order of 1%. The blowdown may be continuous, or may be intermittent, e.g. 10× the steady state flow for 6 seconds out of every minute, 5× the steady state flow for 1 minute out of every 5 minutes, etc. The need for a water discharge stream can be eliminated by pumping the blowdown into the hot oxygen exhaust.

The steam output from the steam generator 104 may be provided to the steam recuperator 108. However, if the system 200 includes the optional mixer 106, the steam may be provided to the mixer 106 prior to being provided to the steam recuperator 108. In particular, the steam may include small amounts of dissolved air and/or oxygen. As such, the mixer 106 may be configured to mix the steam with hydrogen gas, in order to maintain a reducing environment in the stack 100, and in particular, at the fuel electrodes 7.

The mixer 106 may be configured to mix the steam with hydrogen received from a hydrogen storage device 52 and/or with a portion of the hydrogen stream output from the stack 100. The hydrogen addition rate may be set to provide an amount of hydrogen that exceeds an amount of hydrogen needed to react with an amount of oxygen dissolved in the steam. The hydrogen addition rate may either be fixed or set to a constant water to hydrogen ratio. However, if the steam is formed using water that is fully deaerated, the mixer 106 and/or hydrogen addition may optionally be omitted.

In some embodiments, the hydrogen may be provided by the external hydrogen source during system startup and/or during steady-state operations. For example, during startup, the hydrogen may be provided from the hydrogen storage device, and during steady-state, the hydrogen may be provided from the hydrogen storage device 52 and/or by diverting a portion of the hydrogen stream (i.e., hydrogen exhaust stream) generated by the stack 100 to the mixer 106. In particular, the system 200 may include a hydrogen diverter 116, such as a splitter, pump, blower and/or valve, configured to selectively divert a portion of the generated hydrogen stream to the mixer 106, during steady-state operation.

The steam recuperator 108 may be a heat exchanger configured to recover heat from the hydrogen stream output from the stack 100. As such, the steam recuperator 108 may be configured to increase the efficiency of the system 200. The steam may be heated to at least 700° C., such as 720° C. to 780° C. in the steam recuperator 108.

The steam output from the steam recuperator 108 may be provided to the steam heater 110 which is located downstream from the steam recuperator 108, as shown in FIG. 2A. The steam heater 110 may include a heating element, such as a resistive or inductive heating element. The steam heater 110 may be configured to heat the steam to a temperature above the operating temperature of the stack 100. For example, depending on the health of the stack 100, the water utilization rate of the stack 100, and the air flow rate to the stack 100, the steam heater 110 may heat the steam to a temperature ranging from about 900° C. to about 1200° C., such as 920° C. to 980° C. Accordingly, the stack 100 may be provided with steam or a steam-hydrogen mixture at a temperature that allows for efficient hydrogen generation. Heat may also be transported directly from the steam heater to the stack by radiation (i.e., by radiant heat transfer).

In one alterative embodiment shown in FIG. 2B, the steam recuperator 108 may be located downstream from the steam heater 110 such that steam existing the steam heater 110 enters the steam recuperator 108 instead of vice-versa. In another alternate embodiment, the steam heater 110 may include a heat exchanger configured to heat the steam using heat extracted from a high-temperature fluid, such as a fluid heated to about 1200° C. or more. This fluid may be provided from a solar concentrator farm or a power plant, such as a nuclear reactor power plant, for example. Alternatively, if the fluid is a high temperature steam, such as steam provided from a nuclear reactor power plant, then such steam may be provided to the fuel electrodes 7 of the stack 100. In this case, the water source 50 may comprise a source of high temperature steam, and one or more of the water preheater 102, steam generator 104, steam recuperator 108 and/or steam heater 110 may be omitted.

In some embodiments, the steam heater 110 may include multiple steam heater zones with independent power levels (divided vertically or circumferentially or both), in order to enhance thermal uniformity, in some embodiments.

In some embodiments, the operations of the steam recuperator 108 and the steam heater 110 may be combined into a single component. For example, the steam recuperator 108 may include a voltage source configured to apply a voltage to heat exchange fins of the steam recuperator 108, such that the heat exchange fins operate as resistive heating elements and heat the steam to a temperature high enough to be provided to the stack 100, such as a temperature ranging from about 900° C. to about 1200° C. The high temperature steam (or optionally a steam/hydrogen mixture) output from the steam heater 110 may be provided to the fuel electrodes 7 of the stack 100.

The oxygen exhaust output from the stack 100 may be provided to the air recuperator 112. The air recuperator 112 may be provided with ambient air by an air blower 118. The air recuperator 112 may be configured to heat the air using heat extracted from the oxygen exhaust. In some embodiments, the ambient air may be filtered to remove contaminants, prior to being provided to the air recuperator 112 or the air blower 118.

Air output from the air recuperator 112 may be provided to the air heater 114. The air heater may include a resistive or inductive heating element configured to heat the air to a temperature exceeding the operating temperature of the stack 100. For example, depending on the health of the stack 100, the water utilization rate of the stack 100, and the air flow rate to the stack 100, the air heater 114 may heat the air to a temperature ranging from about 900° C. to about 1200° C., such as 920° C. to 980° C. Accordingly, the stack 100 may be provided with air at a temperature that allows for efficient hydrogen generation. Heat may also be transported directly from the air heater to the stack by radiation.

The higher the temperature output from the air recuperator, the less power is required for the air heater 114. Increased pressure drop on either side of the air recuperator 112 may be counteracted with increased air blower 118 power. Increased pressure drop may aid the circumferential mass flow uniformity, creating a more uniform heat transfer environment, and higher temperature for the air inlet stream output from the air recuperator 112.

In alternative embodiments, the air heater 114 may include a heat exchanger configured to heat the air using heat extracted from a high-temperature fluid, such as a fluid heated to about 1200° C., or more. This fluid may be provided from a solar concentrator farm or a nuclear reactor, for example.

The air heater 114 may include multiple air heater zones with independent power levels (divided vertically or circumferentially or both), in order to enhance thermal uniformity, in some embodiments. In some embodiments, the air heater 114 may be disposed below the air recuperator 112, or between the stack 100 and the steam recuperator 108. The air heater 114 may include baffles having slits of different sizes at different heights along the baffles, to allow air to exit the air heater 114 approximately evenly in both temperature and height, at all heights along the air heater 114. Air from the air heater 114 is provided to the air electrodes 3 of the stack 100.

In some embodiments, the air recuperator 112 and the air heater 114 may be combined into a single component. For example, the air recuperator 112 may include a voltage source configured to apply a voltage to heat exchange fins of a heat exchanger included in the air recuperator 112 combined component, such that the fins operate as resistive heating elements and heat the air to a temperature high enough to be provided to the stack 100, such as a temperature ranging from about 900° C. to about 1200° C.

According to various embodiments, the system 200 may include an optional air preheater 54 disposed outside of the hotbox 250. In particular, the air preheater 54 may be configured to preheat air provided to the hotbox 250 by the air blower 118. In some embodiments, the air preheater 54 may operate using electricity. In other embodiments, the air preheater 54 may operate using a hydrocarbon fuel, such as natural gas or the like. For example, if the system 200 is provided with power from a power source that is intermittent or provides an insufficient amount of power to operate an electric heater, such as solar or wind power generation systems, the air preheater 54 may utilize a hydrocarbon power source (e.g., a gas heater). Alternatively, the air preheater 54 may be omitted.

Because the air preheater 54 is located outside of the hotbox 250, the air preheater 54 may be advantageously serviced without the need to access the inside of the hotbox 250 and/or interrupt the operation of the stack 100 and/or other components located inside of the hotbox 250. In some embodiments, the air preheater 54 may allow for the air heater 114 to be omitted if the air preheater 54 heats the air above stack temperature. However, in other embodiments, the system 200 may include both the air preheater 54 and the air heater 114.

During system startup, the air preheater 54 may be configured to heat air provided to the hotbox to a temperature sufficient to increase the internal temperature of the hotbox 250 and/or the temperature of the stack 100 up to a temperature approaching the operating temperature thereof. Preheated air provided to the air recuperator 112 may also operate to preheat stack exhaust provided through the air recuperator 112 to the water preheater 102 during system startup. Since the stack oxygen exhaust may be initially output at a relatively low temperature, the air preheater 54 may be used to indirectly preheat the water provided from the water source 50 to the hotbox 250.

During steady-state operation, the air preheater 54 may also be configured heat air to a temperature sufficient to maintain the hotbox 250 at steady-state operating temperature, such as 750 to 950° C. For example, the heat output of the air preheater 54 may be lower during steady-state operation than during system startup.

In some embodiments, the system 200 may be operated in a thermal neutral configuration, where each electrolyzer cell 1 in the stack 100 is provided with a thermal-neutral voltage. In particular, the current provided to each electrolyzer cell 1 may be varied such that the heat generated by $I^2R$ heating balances the (endothermic) heat of reaction. As such, use of the steam heater 110 and/or the air heater 114 may be minimized or eliminated during steady-state thermal neutral operation.

A hydrogen stream (i.e., hydrogen exhaust stream) from the stack 100 may be a warm stream containing hydrogen gas and water. The hydrogen stream may be output from the steam recuperator 108 at a temperature of 120° C. to 150° C. The steam recuperator 108 may be fluidly connected to a hydrogen processor 500 by an output conduit 502. In some embodiments, the hydrogen processor 500 may be connected to, a hydrogen storage device or tank 504.

The hydrogen processor 500 may include a hydrogen pump, a condenser, or a combination thereof. The hydrogen pump may be an electrochemical hydrogen pump and/or may be configured to operate at a high temperature. For example, the hydrogen pump may be configured to operate at a temperature of from about 120° C. to about 150° C., in order to remove from about 70% to about 90% of the hydrogen from the hydrogen stream. The compressor may be a liquid ring compressor or a diaphragm compressor, for example. In some embodiments, the condenser may be an air-cooled or water-enhanced, air-cooled condenser and/or heat exchanger configured to cool a hydrogen stream to a temperature sufficient to condense water vapor in the hydrogen stream. For example, the hydrogen processor 500 may be configured to compress the hydrogen stream to a desired pressure, such as about 2500 to about 8000 psig. Compression may include multiple stages, with inter-stage cooling, and water removal.

In various embodiments, the hydrogen processor 500 may include a series of electrochemical hydrogen pumps, which may be disposed in series and/or in parallel with respect to a flow direction of the hydrogen stream, in order to compress the hydrogen stream. The final product from compression may still contain traces of water. As such, the hydrogen processor 500 may include a dewatering device, such as a temperature swing adsorption reactor or a pressure swing adsorption reactor, to remove this residual water, if necessary. The final product may be high pressure (e.g., about 2500 to about 8000 psig) purified, hydrogen. The product may also contain some nitrogen gas, which may be dissolved air in the water. The nitrogen may be removed automatically during electrochemical compression.

A remaining un-pumped effluent from the hydrogen processor 500 may be a water rich stream that is fully vaporized. This water rich stream may be fed to a blower for recycle into the mixer 106 or stream recuperator 108, eliminating the need for water vaporization in the steam generator 104. The system may be configured to repurify (e.g., in DI beds) the residual water and provide the residual water removed from the compressed hydrogen stream to the water preheater. Electrochemical compression may be more electrically efficient than traditional compression.

The hydrogen streams of multiple stacks 100 on site may be combined into a single stream. This combined stream may be cooled as much as practical using, for example, air coolers or heat exchangers cooled by a site cooling water tower, which may be part of the hydrogen processor 500. The hydrogen output from the hydrogen processor 500 may be provided to the hydrogen tank 504 for storage or use, such as to be used as a fuel in a fuel cell power generation system.

Steam loss into the hydrogen stream may be minimized by increasing the hydrogen pump pressure to a pressure ranging from about 20-50 psig, for example. This separation may be at the electrolyzer module level, system level, stamp level, or site level.

Water condensation and compression of the hydrogen stream may consume a significant amount of power. In some embodiments, air flow to the stack 100 may be reduced or stopped, such that the stack 100 outputs pure or nearly pure oxygen gas as stack exhaust. In addition, the air and fuel sides of the electrolyzer cells 1 may be operated at an equal pressure ranging from about 20 psig to about 50 psig. In some embodiments, air provided to the stack 100 may be provided at a pressure of about 100 slm or less.

High pressure operation may allow for the elimination of the power and equipment associated with the first stage of the hydrogen stream compression, may reduce the size of the initial condenser stage, due to the higher dew point due to the higher pressure, and/or may reduce the physical space required for flow channels, due to the higher density associated with higher pressure.

As noted above, the system 200 may be configured to operate with a variety of different hydrogen processors 500, which may be provided on site by a third party. As such, it may be difficult to match the flow and/or production rate of the hydrogen stream output from the system 200 with the throughput of a particular hydrogen processor 500. In particular, such variations may induce positive and/or negative pressure fluctuations within the output conduit 502. For example, if the throughput of the hydrogen processor 500 is too high (e.g., the hydrogen processor 500 pulls too hard on the hydrogen stream) a negative pressure may be induced within the system 200, or if the throughput is too low, a positive pressure may be induced within the system 200.

Such pressure fluctuations may cause problems within the system 200. For example, excessive negative pressures may result in air leaking into the system 200, or may result in a high pressure variation across the electrolytes of the stack 100, which may increase the risk of electrolyte damage, such as cracking. Excessively high pressures may also result in pressure variations across the electrolytes and increase the risk of electrolyte damage.

Accordingly, the system may include a first output conduit 502A, a second output conduit 502B, and a hydrogen blower 510. The first output conduit 502A may fluidly connect the fuel cell stack 100 and an inlet of the hydrogen blower 510. The second output conduit 502B may fluidly connect an outlet of the hydrogen blower 510 to the hydrogen processor 500. The hydrogen blower 510 may be configured to increase the pressure of the hydrogen stream output from the hotbox 250. For example, the hydrogen blower 510 may be configured to increase the pressure of a hydrogen stream by from about 2 to about 15 pounds per square in gauge (psig), such as from about 5 to about 10 psig. The hydrogen blower 510 may also operate to isolate the components of the hotbox 250, such as the stack 100, from pressure fluctuations induced by the operation of the hydrogen processor 500.

In some embodiments, the hydrogen blower 510 may be configured to receive a hydrogen stream generated by a single electrolyzer system 250 or stack 100, as shown in FIG. 2A. In other embodiments, the hydrogen blower 510 may be configured to receive hydrogen streams generated by multiple electrolyzer systems 250 and/or by multiple stacks 100.

In various embodiments, the system 200 may include an optional water knockout device 530 configured to remove condensed water from the hydrogen stream, in order to reduce and/or prevent liquid water accumulation in the hydrogen blower 510.

In some embodiments, the hydrogen diverter 116 may be used to divert the hydrogen stream, such that hydrogen may be fed to displace most or all of the steam in the system 200. The hydrogen diverter 116 may then closed to maintain a reducing atmosphere in the stack 100, without any additional hydrogen consumption. Air flow to the stack 100 may be significantly reduced or eliminated. In some embodiments, there may be a minimum air flow to keep the air heater 114 from overheating.

In some embodiments, condensed water may be recycled to the feed of the process (feed to the DI beds) in the water source 50. Hydrogen added to the steam in the mixer 106 may be produced during the first stage or any intermediate stage of the compression train, and may be dehumidified if necessary. The hydrogen storage device 52 may include a low/intermediate pressure storage tank for the hydrogen provided through the mixer 106 to the stack 100.

According to various embodiments, the system 200 may include a controller 125, such as a central processing unit, that is configured to control the operation of the system 200. For example, the controller 125 may be wired or wirelessly connected to various elements of the system 200 to control the same.

In some embodiments, the controller 125 may be configured to control the speed of the hydrogen blower 510 based on a flow rate of the hydrogen stream and/or an inlet pressure generated by the hydrogen processor 500.

In some embodiments, the controller 125 may be configured to control the system 200, such that the system 200 may be operated in a standby mode where no hydrogen stream is generated. During the standby mode, electrical heaters associated with (i.e., located in a heat transfer relationship with) the stack 100 may be run at the minimum power level needed to keep the electrolyzer cells 1 at a desired standby temperature. The desired standby temperature may be different from the desired production operating temperature, and may be impacted by an acceptable time needed to return to a desired operating temperature.

Recovery from standby mode to steady-state operation may allow for hydrogen generation to be initiated at a lower temperature than the standard steady-state operating temperature. At the lower temperature, cell resistance may be higher, which may provide additional heating to increase the stack 100 to the steady-state operating temperature. Water/steam feed can be significantly reduced or eliminated. Hydrogen addition to the steam in the mixer 106 may also be significantly reduced or eliminated.

According to various embodiments, the controller 125 may be configured to control the operation of the system 200 based on various site-wide control parameters. For example, the controller 125 may be configured to control hydrogen production based on any of: the operational limits of each SOEC stack; power availability; instantaneous average power costs, including the impact of demand charges at all tiers; instantaneous marginal power costs, including the impact of demand charges at all tiers; instantaneous power renewable content; available hydrogen storage capacity; stored energy available for use (e.g., either thermal storage or electrical storage); a hydrogen production plan (e.g., a daily, weekly, or month plan, etc.); hydrogen production revenue implications (e.g., sales price, adjustments for production levels, penalties for nonperformance, etc.); a maintenance plan; the relative health of all hotboxes on site; the compression/condensation train mechanical status; the water/steam/hydrogen feed availability; the weather conditions and/or forecast; any other known external constraints, either instantaneous, or over some production plan period (e.g., only allowed so much water per month, or so many MW-hr per month); and/or the minimum acceptable time to start producing hydrogen from standby mode (if standby is predicted to last multiple hours, it may be desirable to allow the cells to cool below operating temperature).

Figure 3:
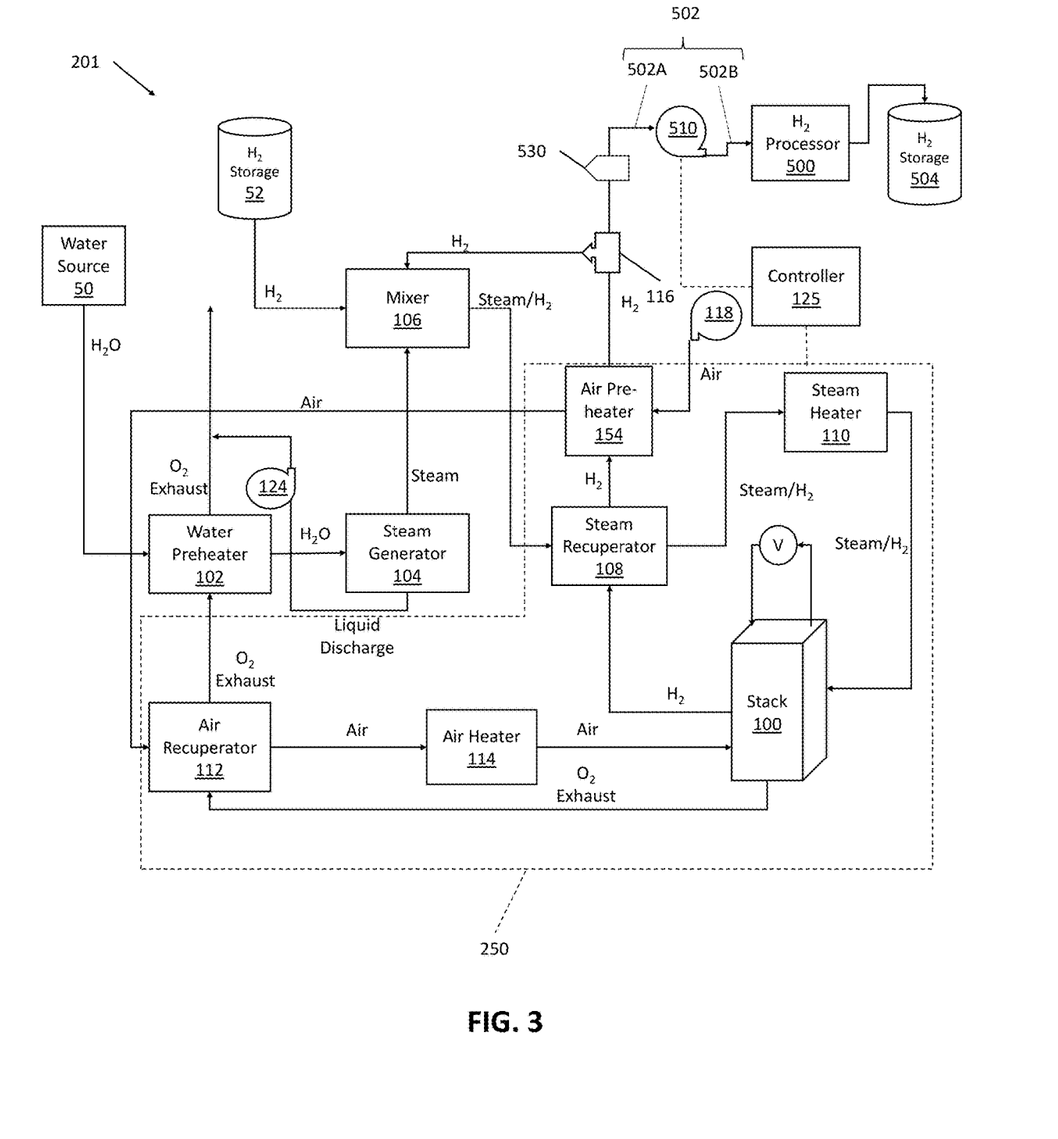
FIG. 3 is a schematic view showing a process flow in an alternative electrolyzer system 201, according to various embodiments of the present disclosure.

FIG. 3 is a schematic view showing a process flow in an alternative electrolyzer system 201, according to various embodiments of the present disclosure. The electrolyzer system 201 may be similar to the electrolyzer system 200, so only the differences there between will be discussed in detail.

Referring to FIG. 3, the electrolyzer system 201 may include an air preheater 154 disposed inside of the hotbox 250. The air preheater 154 may be a heat exchanger configured to preheat air provided from the air blower 118, using heat extracted from the hydrogen stream output from the steam recuperator 108. The preheated air may then be provided to the air recuperator 112. Thus, the internal air preheater 154 located inside the hotbox 250 replaces the external air preheater 54 (shown in FIGS. 2A and 2B) located outside the hotbox 250. In this embodiment, additional electricity or an additional gas heater is not required to provide heat to the air preheater 154. The air preheater is also beneficial in that the hydrogen/steam stream to the hydrogen diverter 116 is substantially cooler, allowing the hydrogen separator to be made of cheaper materials.

In some embodiments, a small amount of liquid water (e.g., from about 0.5% to about 2% of incoming water) may be periodically or continuously discharged from the steam generator 104. In particular, the discharged liquid water may include scale and/or other mineral impurities that may accumulate in the steam generator 104 while vaporizing water to generate steam. Therefore, this discharged liquid water is not desirable for being recycled into the water inlet stream from the water source 50. This liquid discharge may be mixed with the hot oxygen exhaust stream output from the water preheater 102 into an exhaust conduit. The hot oxygen exhaust stream may have a temperature above 100° C., such as 110 to 130° C., for example 120° C. ° C. As such, the liquid water discharge may be evaporated by the hot oxygen exhaust stream, such that no liquid water is required to be discharged from the system 201. The system 201 may optionally include a pump 124 configured to pump and regulate the liquid water discharge output from the steam generator 104 into the oxygen exhaust output from the water preheater 102. Optionally, a proportional solenoid valve may be added in addition to the pump 124 to additionally regulate the flow of the liquid water discharge.

SOFC Systems

Figure 4:
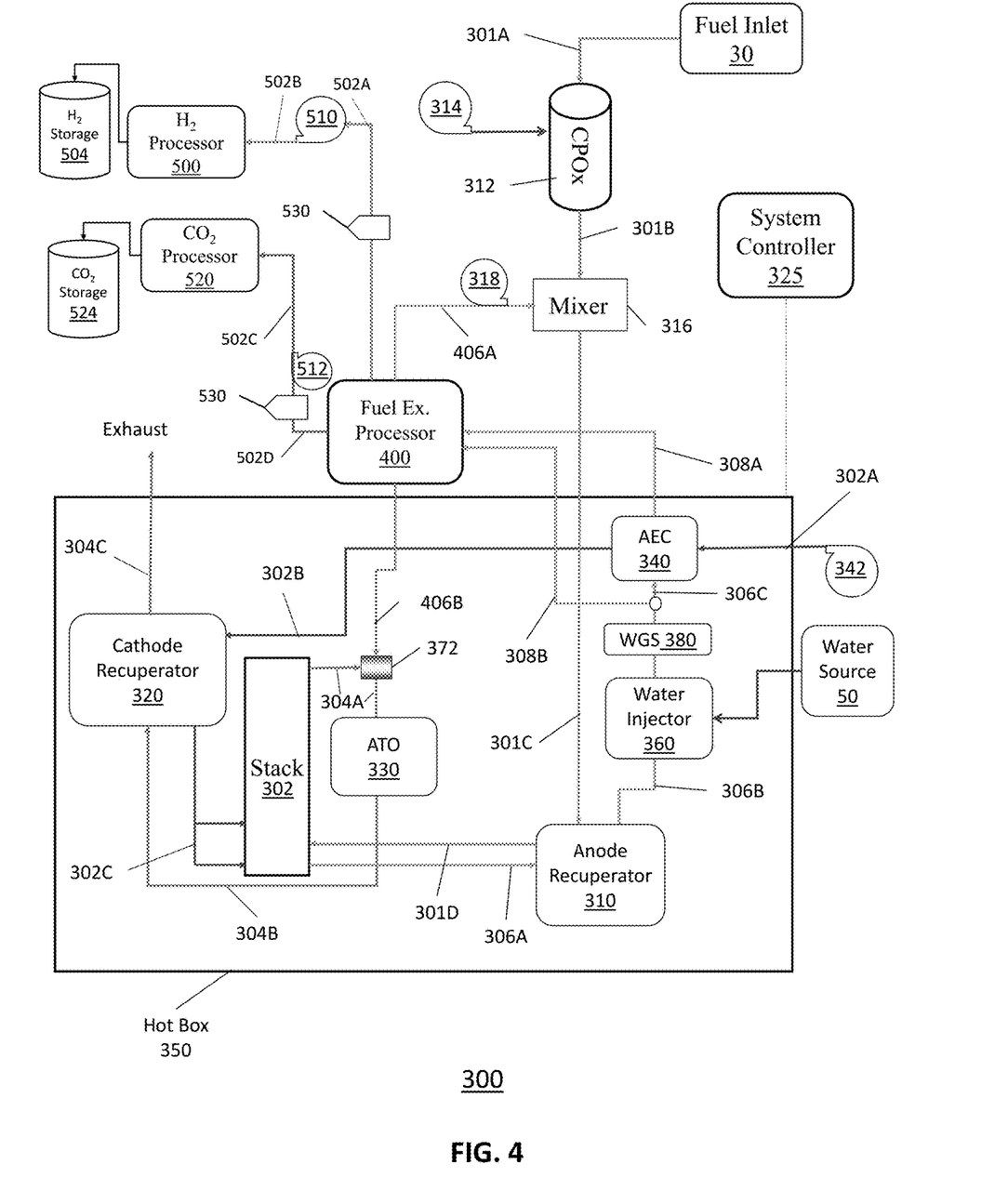
FIG. 4 is a schematic representation of a solid oxide fuel cell (SOFC) system, according to various embodiments of the present disclosure.

FIG. 4 is a schematic representation of a solid oxide fuel cell (SOFC) system 300, according to various embodiments of the present disclosure. Referring to FIG. 4, the system 300 includes a hotbox 350 and various components disposed therein or adjacent thereto. The hotbox 350 may contain at least one fuel cell stack 302, such as a solid oxide fuel cell stack containing alternating fuel cells and interconnects. One solid oxide fuel cell of the stack contains a ceramic electrolyte, such as yttria stabilized zirconia (YSZ), scandia stabilized zirconia (SSZ), scandia and ceria stabilized zirconia or scandia, yttria and ceria stabilized zirconia, an anode electrode, such as a nickel-YSZ, a nickel-SSZ or nickel-doped ceria cermet, and a cathode electrode, such as lanthanum strontium manganite (LSM). The interconnects may be metal alloy interconnects, such as chromium-iron alloy interconnects. The stacks 302 may be arranged over each other in a plurality of columns.

The hotbox 350 may also contain an anode recuperator 310, a cathode recuperator 320, an anode tail gas oxidizer (ATO) 330, an anode exhaust cooler 340, a vortex generator 372, and a water injector 360. The system 300 may also include a catalytic partial oxidation (CPOx) reactor 312, a mixer 316, a CPOx blower 314 (e.g., air blower), a main air blower 342 (e.g., system blower), and an anode recycle blower 318, which may be disposed outside of the hotbox 350. However, the present disclosure is not limited to any particular location for each of the components with respect to the hotbox 350.

The CPOx reactor 312 receives a fuel inlet stream from a fuel inlet 30, through a fuel conduit 301A. The fuel inlet 30 may be a fuel tank or a utility natural gas line including a valve to control an amount of fuel provided to the CPOx reactor 312. The CPOx blower 314 may provide air to the CPOx reactor 202 during system start-up. The fuel and/or air may be provided to the mixer 316 by a fuel conduit 301B. Fuel flows from the mixer 316 to the anode recuperator 310 through a fuel conduit 301C. The fuel is heated in the anode recuperator 310 by a portion of the fuel exhaust and the fuel then flows from the anode recuperator 310 to the stack 302 through a fuel conduit 301D.

The main air blower 342 may be configured to provide an air stream (e.g., air inlet stream) to the anode exhaust cooler 340 through air conduit 302A. Air flows from the anode exhaust cooler 340 to the cathode recuperator 320 through air conduit 302B. The air is heated by the ATO exhaust in the cathode recuperator 320. The air flows from the cathode recuperator 320 to the stack 302 through air conduit 302C.

Anode exhaust (e.g., fuel exhaust) generated in the stack 302 is provided to the anode recuperator 310 through anode exhaust conduit 306A. The anode exhaust may contain unreacted fuel and may also be referred to herein as fuel exhaust. The anode exhaust may be provided from the anode recuperator 310 to a shift reactor 380, such as a water gas shift (WGS) reactor, by anode exhaust conduit 306B. A water injector 360 may be fluidly connected to the anode exhaust conduit 306B. The anode exhaust may be provided from the shift reactor 380 to the anode exhaust cooler 340 by anode exhaust conduit 306C. The anode exhaust heats the air inlet stream in the anode exhaust cooler 340 and may then be provided from the anode exhaust cooler 340 to the fuel exhaust processor 400.

In particular, the anode exhaust may be output from the anode exhaust cooler 340 to the fuel exhaust processor 400 by a first recycling conduit 308A. In some embodiments, anode exhaust may be provided to the fuel exhaust processor 400 by an optional second recycling conduit 308B. In particular, the second recycling conduit 308B may be configured to provide hotter anode exhaust to the fuel exhaust processor 400 than the first recycling conduit 308A, since anode exhaust is cooled in the anode exhaust cooler 340 prior to entering the first recycling conduit 308A.

The shift reactor 380 may be any suitable device that converts components of the fuel exhaust into free hydrogen ($H_2$) and/or water. For example, the shift reactor 380 may comprise a tube or conduit containing a catalyst that converts carbon monoxide (CO) and water vapor in the fuel exhaust stream into carbon dioxide and hydrogen, via the water gas shift reaction ($CO+H_2O \leftrightarrow CO_2+H^2$). Thus, the shift reactor 380 increases the amount of hydrogen and carbon dioxide in the anode exhaust and decreases the amount of carbon monoxide in the anode exhaust. For example, the shift reactor 380 may reduce the amount of carbon monoxide in the anode exhaust to about 5% by volume or less, such as about 4% or less, or about 3% or less. The catalyst may be any suitable catalyst, such as an iron oxide or a chromium-promoted iron oxide catalyst.

Cathode exhaust generated in the stack 302 flows to the ATO 330 through cathode exhaust conduit 304A. The vortex generator 372 may be disposed in the cathode exhaust conduit 304A and may be configured to swirl the cathode exhaust. The swirled cathode exhaust may mix with hydrogen output from the fuel exhaust processor 400 before being provided to the ATO 330. The mixture may be oxidized in the ATO 330 to generate ATO exhaust. The ATO exhaust flows from the ATO 330 to the cathode recuperator 320 through the cathode exhaust conduit 304B. Exhaust flows from the cathode recuperator 320 and out of the hotbox 350 through cathode exhaust conduit 304C.

Water flows from a water source 50, such as a water tank or a water pipe, to the water injector 360 through a water conduit. The water injector 360 injects water directly into first portion of the anode exhaust provided in the anode exhaust conduit 306C. Heat from the first portion of the anode exhaust (also referred to as a recycled anode exhaust stream) provided in the exhaust conduit 306C vaporizes the water to generate steam. The steam mixes with the anode exhaust, and the resultant mixture is provided to the anode exhaust cooler 340. The mixture is then routed through the fuel exhaust processor 400 and provided to the mixer 316. The mixer 316 is configured to mix the steam and first portion of the anode exhaust with fresh fuel (i.e., fuel inlet stream). This humidified fuel mixture may then be heated in the anode recuperator 310 by the anode exhaust, before being provided to the stack 302. The system 300 may also include one or more fuel reforming catalysts located inside and/or downstream of the anode recuperator 310. The reforming catalyst(s) reform the humidified fuel mixture before it is provided to the stack 302.

The system 300 may further a system controller 325 configured to control various elements of the system 300. The system controller 325 may include a central processing unit configured to execute stored instructions. For example, the system controller 325 may be configured to control fuel and/or air flow through the system 300, according to fuel composition data.

Fuel Exhaust Processors

Figure 5:
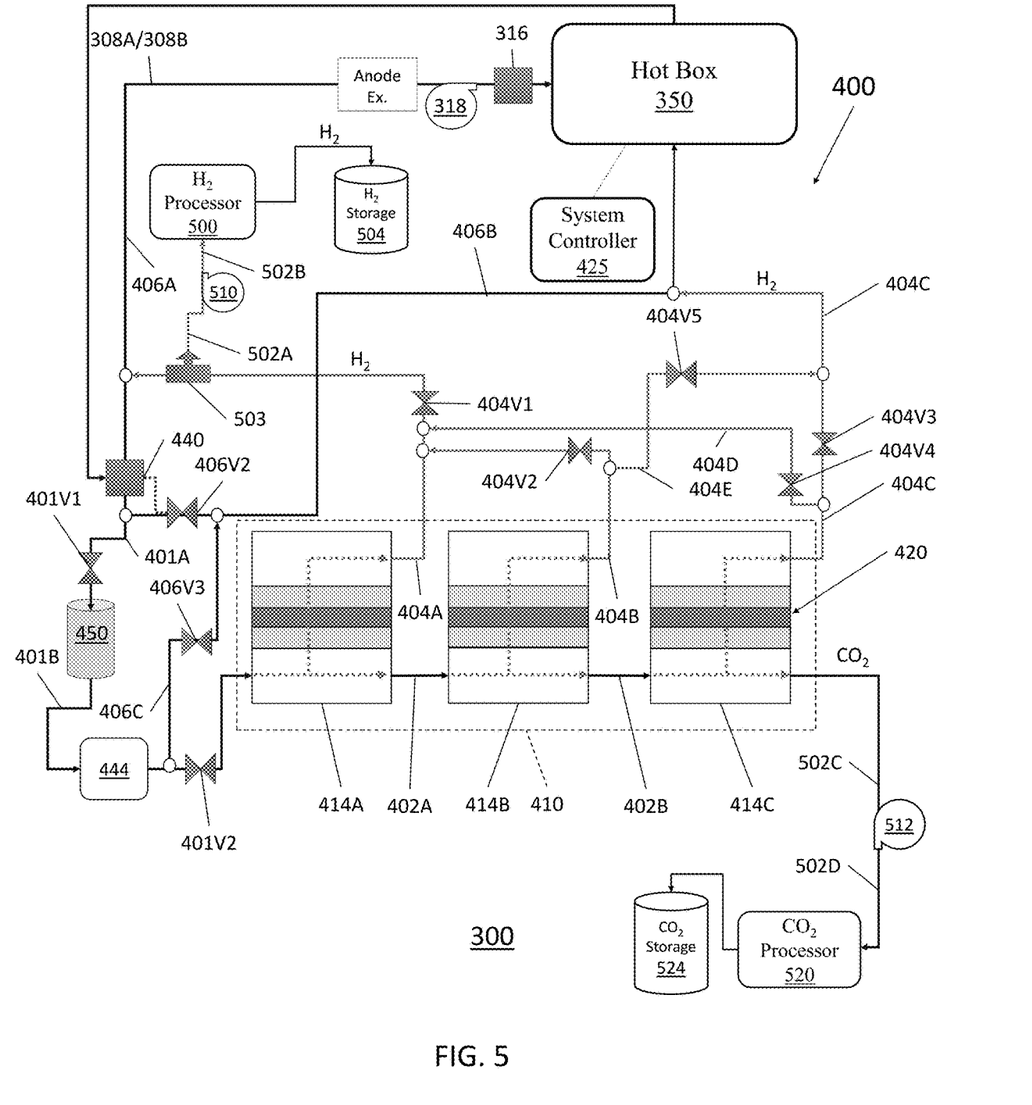
FIG. 5 is a schematic view showing a process flow in a fuel processor of the fuel cell system of FIG. 4, according to various embodiments of the present disclosure.

FIG. 5 is a schematic view showing components of the fuel exhaust processor 400, according to various embodiments of the present disclosure. Referring to FIGS. 4 and 5, the fuel exhaust processor 400 may include a hydrogen separator 410, a system controller 425, a splitter 440, a low temperature shift reactor 450, and a heat exchanger 444. The system controller 425 may be a central processing unit configured to execute stored instructions. For example, the system controller 425 may be configured to control anode exhaust, hydrogen and/or carbon dioxide flow through the fuel exhaust processor 400. In some embodiments, the system controller 425 may be operatively connected to the system controller 325 of the SOFC system 300, such that the system controller 425 may control the fuel exhaust processor based on operating conditions of the SOFC system 300.

The splitter 440 may be configured to receive anode exhaust from the first recycling conduit 308A. The splitter 440 may be fluidly connected to the hotbox 350 and the hydrogen separator 410. For example, a first return conduit 406A may fluidly connect an outlet of the splitter 440 to the hotbox 350, and a first separator conduit 401A and a second separator conduit 401B may fluidly connect an outlet of the splitter 440 to the hydrogen separator 410. In particular, a first portion of the anode exhaust may be output from the splitter 440 and provided to the shift reactor 450 via the first separator conduit 401A, and anode exhaust output form the shift reactor 450 may be supplied to the hydrogen separator 410 by the second separator conduit 401B. A second portion of the anode exhaust may be output from an outlet of the splitter 440 to the first return conduit 406A. Anode exhaust output from the fuel exhaust processor 400 may be move through the first return conduit 406A to the mixer 316 of the SOFC system 300, by the anode recycle blower 318. However, the anode recycle blower 318 may be disposed in any other suitable location.

The shift reactor 450 may be a WGS reactor similar to the shift reactor 380, but may configured to operate at a lower temperature than the shift reactor 380. Accordingly, the shift reactor 380 may be referred to as a high temperature shift reactor, and the shift 450 may be referred to as a low temperature shift reactor. The shift reactor 450 may be configured to further reduce the carbon monoxide content of the anode exhaust provided to the fuel exhaust processor 400. For example, the shift reactor 450 may be configured to reduce the carbon monoxide content of the anode exhaust to less than about 0.3% by volume, such as less than about 0.2%, or less than about 0.1%.

Purified anode exhaust (e.g., low carbon monoxide content anode exhaust) output from the shift reactor 450 may be provided to the hydrogen separator 410 by a second separator conduit 401B. The heat exchanger 444 may be operatively connected to the second separator conduit 401B and may be configured to cool anode exhaust passing there through. For example, the heat exchanger 444 may include fans and/or cooling fins configured to transfer heat to air supplied thereto. Accordingly, the heat exchanger 444 may be configured to cool the anode exhaust, in order to prevent overheating and/or damage to the hydrogen separator 410. In some embodiments, the heat exchanger 444 may be omitted. For example, if the shift reactor 450 includes an internal cooling system, as disclosed below with respect to FIGS. 4A and 4B, the heat exchanger 444 may optionally be omitted.

In various embodiments, the fuel exhaust processor 400 may be fluidly connected to multiple fuel cell systems 300. For example, the fuel exhaust processor 400 may be configured to process anode exhaust output from two or more fuel cell systems, and may be configured to return hydrogen rich fuel streams to both fuel cell systems.

The hydrogen separator 410 may include one or more hydrogen pumps, which may each include electrochemical hydrogen pumping cells 420. For example, as shown in FIG. 2, the hydrogen separator 410 may include a first hydrogen pump 414A, a second hydrogen pump 414B, and a third hydrogen pump 414C, that each comprise stacked hydrogen pumping cells 420. However, the present disclosure is not limited to any particular number of hydrogen pumps. For example, in various embodiments, the first hydrogen pump 414A and the second hydrogen pump 414B may be combined into a single stack of hydrogen pumping cells 420. In other embodiments, the first, second, and third hydrogen pumps 414A, 414B, 414C may be combined into a single stack of hydrogen pumping cells 420.

In some embodiments, the first hydrogen pump 414A may include a larger number of hydrogen pumping cells 420 than the second and/or third hydrogen pumps 414B, 414C. For example, the first hydrogen pump 414A may include twice the number of hydrogen pumping cells 420 as the second hydrogen pump 414B and/or the third hydrogen pump 414C.

In still other embodiments, the fuel exhaust processor 400 may output only a single hydrogen stream. For example, the third hydrogen pump 414C may be omitted. In particular, heat generated by exothermic reactions in the ATO 330 may be used to offset heat losses due to endothermic fuel reformation reactions occurring in the anode recuperator 310, by using the ATO exhaust to heat air provided to the fuel cell stack 302 in the cathode recuperator 320.

The second separator conduit 401B may provide anode exhaust to an anode inlet of the first hydrogen pump 414A. An anode outlet of the first hydrogen pump 414A may be fluidly connected to an anode inlet of the second hydrogen pump 414B by a first exhaust conduit 402A. An anode outlet of the second hydrogen pump 414B may be fluidly connected to an anode inlet of the third hydrogen pump 414C, by a second exhaust conduit 402B. An anode outlet of the third hydrogen pump 414C may be fluidly connected to a carbon dioxide processor 520 by a third output conduit 502C and a fourth output conduit 502D.

The carbon dioxide processor 520 may be fluidly connected to a carbon dioxide storage device or tank 524. The carbon dioxide processor 520 may operate to compress and/or cool a carbon dioxide stream received from the fuel exhaust processor 400. The processor may be a condenser and/or dryer configured to remove water from the carbon dioxide stream. The carbon dioxide stream may be provided to the carbon dioxide processor 520 in the form of a vapor, liquid, solid or supercritical carbon dioxide.

A first hydrogen conduit 404A may be fluidly connected to a cathode outlet of the first stack 410A, a second hydrogen conduit 404B may be fluidly connected to a cathode outlet of the second stack 410B, and a third hydrogen conduit 404C may be fluidly connected to a cathode outlet of the third stack 410C. The first hydrogen conduit may be fluidly connected to a first return conduit 406A, and the second hydrogen conduit 404B may be fluidly connected to the first hydrogen conduit 404A. In particular, the first return conduit 406A may be configured to provide hydrogen extracted from the anode exhaust by the first hydrogen pump 114A, the second hydrogen pump 414B, and or the third hydrogen pump 414C to the mixer 316, such that the hydrogen may be recycled to the stack 302.

The third hydrogen conduit 404C may be fluidly connected to the fuel cell system 300 by a second return conduit 406B. In particular, the second return conduit 406B may be configured to provide hydrogen extracted from the anode exhaust by the third stack 114C to the second return conduit 406B, which may provide the hydrogen to the ATO 330.

In some embodiments, an optional fourth hydrogen conduit 404D may fluidly connect the third hydrogen conduit 404C to the first hydrogen conduit 404A. An optional fifth hydrogen conduit 404E may fluidly connect the second hydrogen conduit 404B to the third hydrogen conduit 404C. A first output conduit 502A and a second output conduit 502B may fluidly connect the first hydrogen conduit 404A to a hydrogen processor 500.

The hydrogen processor 500 may include, for example, a condenser and/or a compressor and may be fluidly connected to a hydrogen storage tank 504. The condenser may be an air-cooled or water-enhanced, air-cooled condenser and/or heat exchanger configured to cool a hydrogen stream received from the fuel exhaust processor 400, to a temperature sufficient to condense water vapor in the hydrogen stream. The compressor may also be configured to compress the hydrogen, and the hydrogen tank 504 may be configured to store the compressed hydrogen.

The first return conduit 406A may fluidly connect the splitter 440 to the mixer 316 of the fuel cell system 300. The second return conduit 406B may fluidly connect the first separator conduit 401A to the ATO 330, and may also be fluidly connected to the third hydrogen conduit 404C. In other embodiments, the second return conduit 406B may be fluidly connected to an outlet of the splitter 440. A third return conduit 406C may fluidly connect the second separator conduit 401B to the second return conduit 406B.

In various embodiments, the fuel exhaust processor 400 may include various valves to control fluid flow. For example, a first separator conduit valve 401V1 and a second separator conduit valve 401V2 may be respectively configured to control anode exhaust flow through the first and second separator conduits 401A, 401B. A first hydrogen conduit valve 404V1, a second hydrogen conduit valve 404V2, a third hydrogen conduit valve 404V3, a fourth hydrogen conduit valve 404V4, and a fifth hydrogen conduit valve 404V5 may be configured to respectively control hydrogen flow through the first, second, third, fourth, and fifth hydrogen conduits 404A, 404B, 404C, 404D, 404E. A hydrogen storage valve 503, such as a two way valve, may be configured to control hydrogen flow from the first hydrogen conduit 404A into the output conduit 502. A second return conduit valve 406V2 and a third return conduit valve 406V3, may be configured to respectively control anode exhaust flow through the second and third return conduits 406B, 406C.

In some embodiments, the fuel exhaust processor 400 may be fluidly connected to multiple hotboxes 100. For example, the splitter 440 may receive anode exhaust from multiple recycling conduits 308A/308B, and may be fluidly connected to multiple return conduits 406A, 406B. For example, the recycling conduits 308A/308B and the return conduits 406A, 406B may be branched and connected to different hotboxes 100.

The system 300 may be configured to operate with a variety of different hydrogen processors 500 and/or carbon dioxide processors 520, which may be provided on site by a third party. As such, it may be difficult to match the flow and/or production rate of the hydrogen and/or carbon dioxide streams output from the fuel exhaust processor 410 with the throughput of a particular carbon dioxide processor 520. In particular, such variations may induce positive and/or negative pressure fluctuations. For example, if the throughput of the hydrogen processor 500 is too high (e.g., the hydrogen processor 500 pulls too hard on the hydrogen stream) a negative pressure may be induced within the system 300, or if the throughput is too low, a positive pressure may be induced within the system 300.

Such pressure fluctuations may cause problems within the system 300. For example, excessive negative pressures may result in air leaking into the system 300, or may result in a high pressure variation across the electrolytes of the system 300, which may increase the risk of electrolyte damage, such as cracking. Excessively high pressures may also result in pressure variations across the electrolytes and increase the risk of electrolyte damage.

Accordingly, the system 300 may include a hydrogen blower 510 fluidly connected to the first and second output conduits 502A, 502B. The first output conduit 502A may fluidly connect a hydrogen outlet of the fuel exhaust processor 400 to an inlet of the hydrogen blower 510. The second output conduit 502B may fluidly connect an outlet of the hydrogen blower 510 to the hydrogen processor 500. The hydrogen blower 510 may be configured to increase the pressure of the hydrogen stream. For example, the hydrogen blower 510 may be configured to increase the pressure of a hydrogen stream by from about 2 to about 15 pounds per square in gauge (psig), such as from about 5 to about 10 psig. The hydrogen blower 510 may also operate to isolate components of the system 300, such as fuel exhaust processor 400 and/or the stack 302, from pressure fluctuations induced by the hydrogen processor 500.

The system 300 may also include a carbon dioxide blower 512 fluidly connected to the third and fourth output conduits 502C, 502D. The third outlet conduit 502C may fluidly connect a carbon dioxide outlet of the fuel exhaust processor 400 and an inlet of the carbon dioxide blower 512. The second carbon dioxide conduit 502B may fluidly connect an outlet of the carbon dioxide blower 512 to the carbon dioxide processor 520. The carbon dioxide blower 512 may be configured to increase the pressure of the carbon dioxide stream. For example, the carbon dioxide blower 512 may be configured to increase the pressure of a carbon dioxide stream by from about 2 to about 15 pounds per square in gauge (psig), such as from about 5 to about 10 psig. The carbon dioxide blower 512 may also operate to isolate the components of the isolate components of the system 300, such as fuel exhaust processor 400 and/or the stack 302, from pressure fluctuations induced by the carbon dioxide processor 520.

In various embodiments, the system 300 may include an optional water knockout device 530 configured to remove condensed water from the hydrogen stream, in order to reduce and/or prevent liquid water accumulation in the hydrogen blower 510. In other embodiments, the system 300 may include an optional water knockout device 532 configured to remove condensed water from the carbon dioxide stream, in order to reduce and/or prevent liquid water accumulation in the carbon dioxide blower 512.

The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

The invention claimed is:

1. An electrolyzer system, comprising:
a steam generator configured to generate steam;
one or more stacks of solid oxide electrolyzer cells configured to generate a hydrogen stream using the steam generated by the steam generator;
a hotbox housing the one or more stacks;
a hydrogen blower configured to pressurize the hydrogen stream generated by the one or more stacks;
a hydrogen processor configured to compress the pressurized hydrogen stream output from the hydrogen blower;
a first output conduit fluidly connecting a hydrogen outlet of the hotbox to the hydrogen blower; and
a second output conduit fluidly connecting an outlet of the hydrogen blower to an inlet of the hydrogen processor,
wherein the hydrogen processor is configured to compress the pressurized hydrogen stream provided from the hydrogen blower to the hydrogen processor through the second output conduit;
wherein the hydrogen blower is configured to prevent pressure fluctuations generated by the hydrogen processor from being transmitted to the one or more stacks; and
wherein the hydrogen processor includes a hydrogen pump that receives hydrogen streams from multiple hotboxes.

2. The electrolyzer system of claim 1, further comprising a controller configured to control operation of the hydrogen blower, such that the pressurized hydrogen stream has a pressure ranging from about 2 pounds per square inch gauge (psig) to about 15 psig.

3. The electrolyzer system of claim 1, further comprising a hydrogen tank fluidly connected to an outlet of the hydrogen processor.

4. The electrolyzer system of claim 1, further comprising:
a mixer configured to mix hydrogen with steam output from the steam generator; and
a hydrogen diverter configured to divert hydrogen from the first output conduit to the mixer,
wherein an outlet of the mixer is fluidly connected to an inlet fluidly connected to the one or more stacks.

5. The electrolyzer system of claim 4, wherein the mixer is disposed outside of the hotbox.

6. The electrolyzer system of claim 1, further comprising a water knockout device configured to remove condensed water from the first output conduit.

7. The electrolyzer system of claim 1, further comprising:
a water preheater configured to preheat water provided to the steam generator using heat extracted from oxygen exhaust output from the one or more stacks;
a vaporizer configured to generate steam by vaporizing the preheated water; and
a super heater configured to increase the temperature of the steam by about 10° C. to about 100° C.

8. A fuel cell system comprising:
a hotbox;
a stack of solid oxide fuel cells disposed in the hotbox and configured to generate power;
an anode tail gas oxidizer (ATO) disposed in the hotbox;
a fuel exhaust processor configured to separate an anode exhaust stream received from the stack and output a carbon dioxide stream and a hydrogen stream;
a hydrogen blower configured to pressurize the hydrogen stream;
a hydrogen processor configured to compress the pressurized hydrogen stream output from the hydrogen blower;
a first output conduit fluidly connecting a hydrogen outlet of the fuel exhaust processor to the hydrogen blower;
a second output conduit fluidly connecting an outlet of the hydrogen blower to an inlet of the hydrogen processor;
a carbon dioxide processor configured to compress the carbon dioxide stream; and
a carbon dioxide blower configured to pressurize the carbon dioxide stream before the carbon dioxide stream is provided to the carbon dioxide processor,
wherein the hydrogen processor is configured to compress the pressurized hydrogen stream provided from the hydrogen blower to the hydrogen processor through the second output conduit; and
wherein the hydrogen blower is configured to prevent pressure fluctuations generated by the hydrogen processor from being transmitted to the fuel exhaust processor.

9. The fuel cell system of claim 8, further comprising a controller configured to control operation of the hydrogen blower, such that the pressurized hydrogen stream has a pressure ranging from about 2 pounds per square inch gauge (psig) to about 15 psig.

10. The fuel cell system of claim 8, further comprising a hydrogen tank fluidly connected to an outlet of the hydrogen processor.

11. The fuel cell system of claim 8, further comprising
a third output conduit fluidly connecting a carbon dioxide outlet of the fuel exhaust processor to the carbon dioxide blower; and
a fourth output conduit fluidly connecting an outlet of the carbon dioxide blower to an inlet of the carbon dioxide processor.

12. The fuel cell system of claim 11, wherein the carbon dioxide blower is configured to prevent pressure fluctuations generated by the carbon dioxide processor from being transmitted to the fuel exhaust processor.

13. The fuel cell system of claim 11, further comprising a carbon dioxide tank fluidly connected to an outlet of the carbon dioxide processor.

14. The fuel cell system of claim 8, wherein the fuel exhaust processor comprises:
a first hydrogen pump configured to extract hydrogen from the anode exhaust stream received from the stack and to output the hydrogen to a first hydrogen stream provided to the fuel exhaust processor;
a second hydrogen pump configured to extract hydrogen from anode exhaust output from the first hydrogen pump and to output the hydrogen to the first hydrogen stream; and
a third hydrogen pump configured to extract hydrogen from anode exhaust output from the second hydrogen pump and to output the hydrogen to a second hydrogen stream provided to the ATO.

* * * * *